US008472809B2

(12) United States Patent  (10) Patent No.: US 8,472,809 B2
Koike-Akino et al.  (45) Date of Patent: Jun. 25, 2013

(54) ADAPTIVE CROSS-POLARIZATION MODULATION CANCELLERS FOR COHERENT OPTICAL COMMUNICATION SYSTEMS

(75) Inventors: Toshiaki Koike-Akino, Cambridge, MA (US); Cheng Liu, Smyrna, GA (US); Kieran Parsons, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 267 days.

(21) Appl. No.: 13/085,715

(22) Filed: Apr. 13, 2011

(65) Prior Publication Data

US 2012/0263464 A1  Oct. 18, 2012

(51) Int. Cl.
  *H04B 10/00* (2006.01)
(52) U.S. Cl.
  USPC ......................................................... 398/152
(58) Field of Classification Search
  USPC ......................................................... 398/152
  See application file for complete search history.

(56) References Cited

U.S. PATENT DOCUMENTS

| 7,050,513 | B1 * | 5/2006 | Yakhnich | 375/341 |
| 7,477,705 | B2 * | 1/2009 | Vigil | 375/316 |
| 7,643,548 | B2 * | 1/2010 | Hafeez | 375/229 |
| 7,974,002 | B2 * | 7/2011 | Islam et al. | 359/334 |
| 2007/0279284 | A1 * | 12/2007 | Karayil Thekkoott Narayanan | 342/361 |
| 2012/0201288 | A1 * | 8/2012 | Kolze et al. | 375/232 |

OTHER PUBLICATIONS

Magnus Karlsson et al. "Effects of Nonlinearities on PMD-Induced System Impairments," Journal of Lightwave Technology, vol. 24, No. 11, Nov. 2006, pp. 4127-4137.

Marcus Winter et al. "A Statistical Treatment of Cross-Polarization Modulation in DWDM Systems," Journal of Lightwave Techndogy, vol. 27, No. 17, Sep. 1, 2009, pp. 3739-3751.

* cited by examiner

*Primary Examiner* — Shi K Li
*Assistant Examiner* — Jamil Ahmed
(74) *Attorney, Agent, or Firm* — Dirk Brinkman; Gene Vinokur

(57) ABSTRACT

For coherent fiber optic communications, the nonlinear XPolM impairment is the most important issue to realize over-100 Gbps high-speed transmissions. A method provides a way to cancel time-varying XPolM crosstalk by introducing multi-stage adaptive mechanism. In the method, a low-complexity adaptive filtering based on recursive least-squares (RLS) first tracks the time-varying crosstalk along with the per-survivor trellis-state decoding. The estimated channel and the decoded data are then used to calculate the empirical covariance, which is in turn exploited to obtain more accurate channel estimates by means of optimal-weighted least-squares. This is performed with a low-complexity processing over frequency domain with fast Fourier transform. The performance is significantly improved with turbo principle decoding, more specifically, iterative decoding and iterative estimation over a block.

8 Claims, 4 Drawing Sheets

ADAPTIVE CROSS-POLARIZATION MODULATION CANCELLERS FOR COHERENT OPTICAL COMMUNICATION SYSTEMS

FIELD OF THE INVENTION

This invention relates generally to optical communication systems, and more particularly to reducing depolarization effects due to fiber nonlinearity of cross-polarization modulation.

BACKGROUND OF THE INVENTION

In optical communication systems that use polarization multiplexing (POLMUX), two optical signals are polarized orthogonally with respect to each other before transmitted in an optical channel at a certain wavelength. This doubles the bandwidth of the channel. To realize a high-speed transmission over 100 Gbps, POLMUX and dense-wavelength-division multiplexing (DWDM) are demanded.

However, the constantly alternating bit sequences of the POLMUX signal cause the resulting polarization to change over time. This depolarization effect results in cross-polarization modulation (XPolM), which is essentially noise. The XPolM impairment is induced by inter-channel fiber nonlinearity particularly for DWDM optical communication systems. Due to the XPolM, the dual-polarized (DP) signals, which originally were polarized orthogonally, are no longer so, and cannot be separated at a receiver.

XPolM causes significant performance degradation in bit error rate or in quality factor for DP coherent optical systems. The induced polarization crosstalk has a low-pass response because of chromatic dispersion, resulting in a short coherence time of tens of symbols. Such a fast time-varying polarization crosstalk is hard to track for the current optical communication systems.

The prior art technique, which compensates time-varying XPolM effect, is based on direct cancellation followed by a tentative decision by introducing a simplified XPolM crosstalk model as shown in FIG. 1. For the prior art scheme, hard decisions 110 are first performed to estimate the transmitted signals, assuming no XPolM. Then, the polarization crosstalk factors are estimated 120 by averaging over a number of symbols 130 to reduce the impact of noise. Given these estimated crosstalk factors, the interference is canceled 140.

This cancellation method is simple and it is inaccurate especially at a low signal-to-noise ratio (SNR) due to errors being generated in the initial estimation of the transmitted signal using hard decisions of the received signal. Moreover, this technique is not applicable in the presence of another non-linear effect including cross-phase modulation (XPM) because the simplified XPolM crosstalk model is not valid.

SUMMARY OF THE INVENTION

The embodiments of the invention provide a method for compensating nonlinear XPolM as well as XPM and polarization mode dispersion (PMD) impairments in coherent fiber-optic communication networks, wherein multiple-wavelength lights with POLMUX signals are densely multiplexed.

The method jointly decodes the transmission signal and estimates the XPolM crosstalk by using joint maximum-likelihood (ML) decoding with per-survivor processing (PSP). To achieve fast tracking capability with high accuracy, the method uses a multi-stage estimation structure, wherein a sample channel covariance matrix is obtained by low-complexity recursive least-squares (RLS) and it is used to refine the estimate by using optimum-weighted least-squares (OWLS).

The performance of joint ML decoding with per-survivor processing is further improved by introducing individual trellis-coded modulations (TCM) for DP signals. The use of different TCMs for POLMUX enables the receiver to distinguish DP signals more effectively.

DETAILED DESCRIPTION OF THE PREFERRED EMBODIMENT

Figure 1:
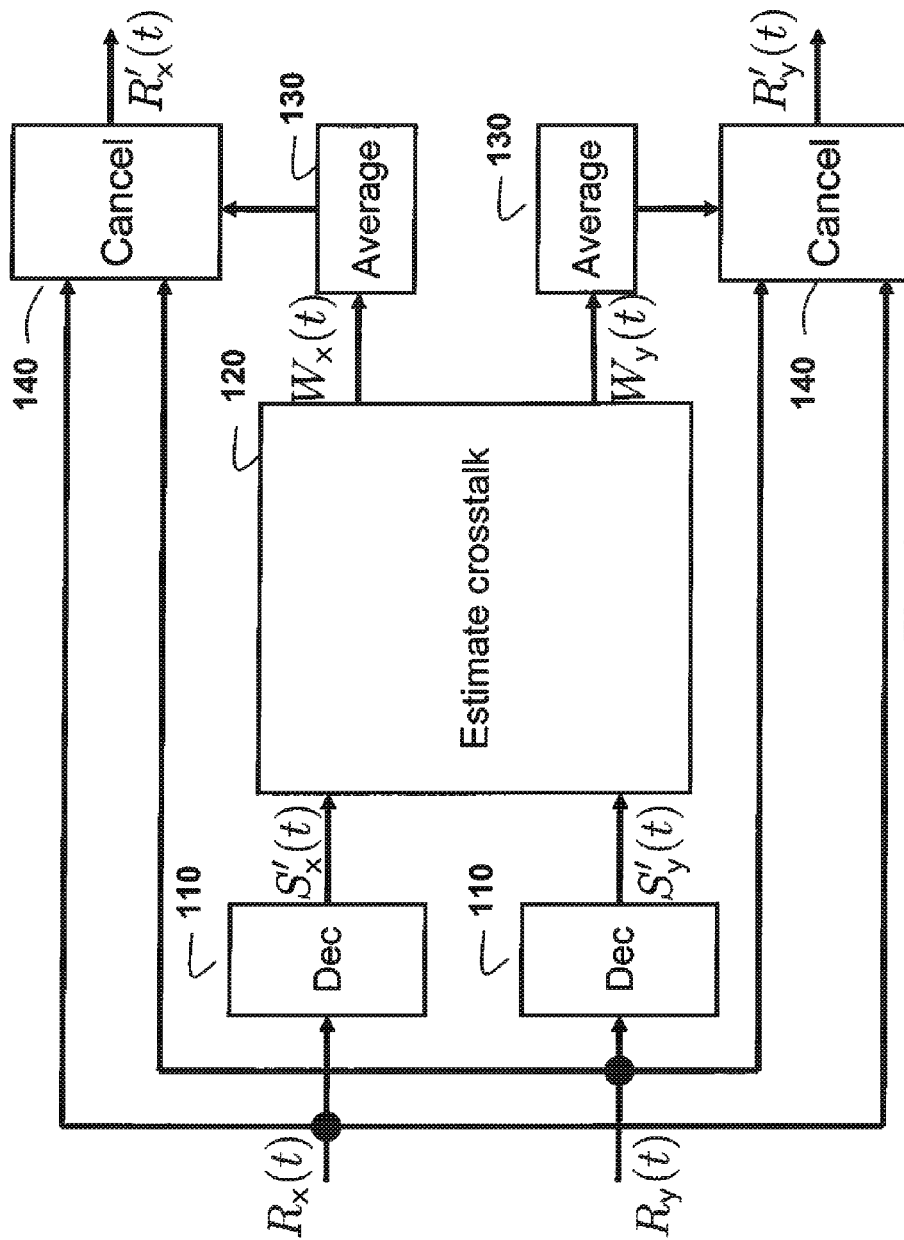
FIG. 1 is a schematic of a prior art method of direct XPolM canceller.
Figure 2:
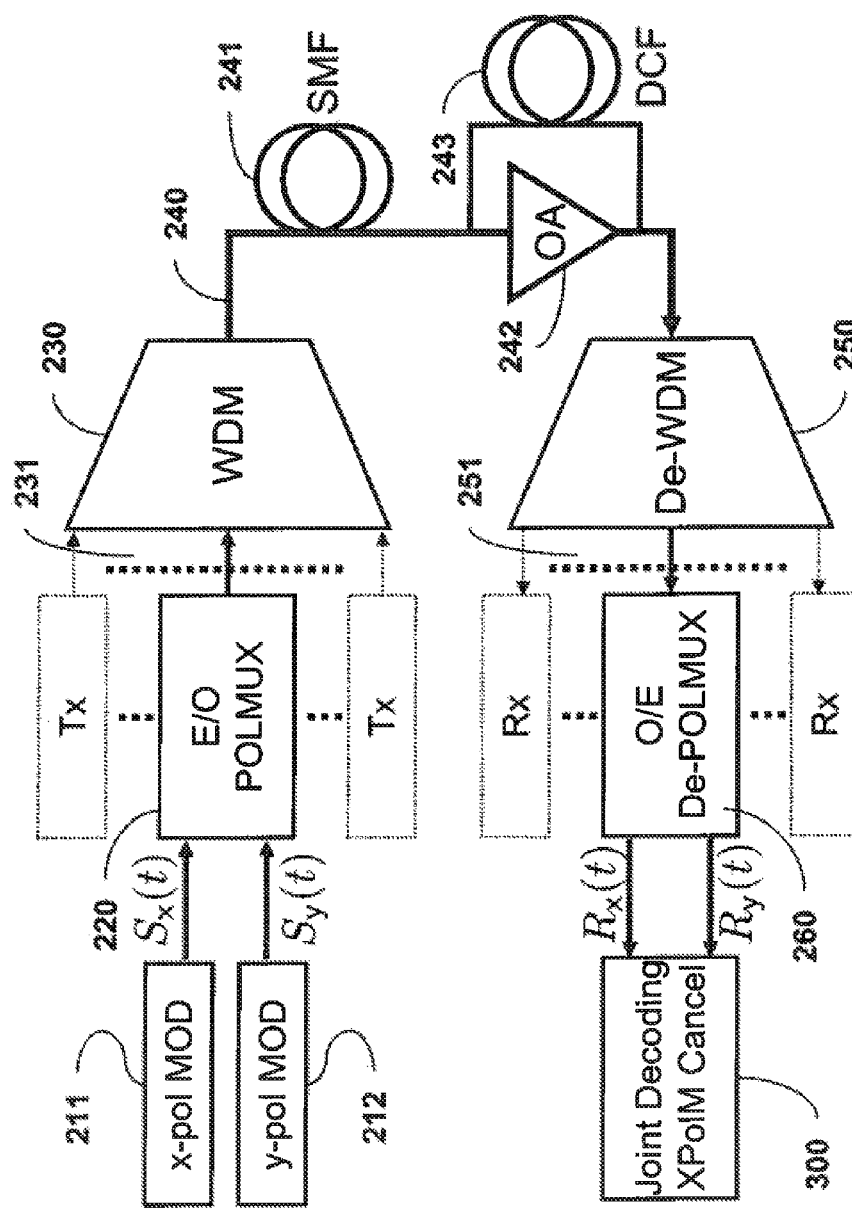
FIG. 2 is a schematic of a coherent fiber-optic communications with DWDM and POLMUX, according to embodiments of the invention.

FIG. 2 shows the preferred embodiments of coherent fiber-optic communication systems 200 which employ POLMUX and WDM. At a certain channel of interest, x-polarization signal $S_x(t)$ and y-polarization signal $S_y(t)$, where t denotes a time instance, are generated by electrical modulators such as DP-quadrature phase-shift keying (QPSK) 211 and 212, respectively. After passing through an electrical filter, x/y-polarization signals $S_x(t)$ and $S_y(t)$ are up-converted to optical wave by an electrical-to-optical (E/O) modulator with POLMUX 220, which orthogonally polarizes $S_x(t)$ and $S_y(t)$.

The up-converted optical signal is then multiplexed with a number of different wavelength lights 231 by a WDM multiplexer such as arrayed waveguide grating device 230. The WDM optical signals propagate through an optical fiber channel 240, which consists of multiple-span sets of single-mode fibers (SMF) 241, optical amplifiers (OA) such as Erbium doped fiber amplifier 242, and dispersion compensation fibers (DCF) 243.

At the receiver end, WDM signals are first de-multiplexed by De-WDM device 250 to separate different wavelength lights to the corresponding receiver circuits 251. For the channel of interest, the optical signal is down-converted by optical-to-electrical (O/E) converter with De-POLMUX 260, which obtains x-polarization received signal $R_x(t)$ and y-polarization received signal $R_y(t)$.

For the dispersion-managed fibers, the received signals $R_x(t)$ and $R_y(t)$ are well modeled by a linear crosstalk representation as follows:

$$\begin{bmatrix} R_x(t) \\ R_y(t) \end{bmatrix} = Ae^{jB} \begin{bmatrix} \sqrt{1-|W(t)|^2}\, e^{jC} & -W^*(t) \\ W(t) & \sqrt{1-|W(t)|^2}\, e^{-jC} \end{bmatrix} \begin{bmatrix} S_x(t) \\ S_y(t) \end{bmatrix} + \begin{bmatrix} N_x(t) \\ N_y(t) \end{bmatrix} \Rightarrow R(t) = H(t)S(t) + N(t),$$

where A corresponds to a received signal magnitude, B is a common phase rotation caused by self-phase modulation (SPM) and cross-phase modulation (XPM), C corresponds to the phase difference between x-polarization and y-polarization, W(t) denotes the crosstalk factor from x-polarization to y-polarization, and [$N_x(t)$, $N_y(t)$] is additive noise for dual polarizations. Here, j denotes an imaginary unit and the superscript [.]* is the complex conjugate. Accordingly, the received signal vector R(t)=[$R_x(t)$, $R_y(t)$] is given by a channel matrix H(t) and the transmitted signal vector S(t)=[$S_x(t)$, $S_y(t)$] plus the noise vector N(t)=[$N_x(t)$, $N_y(t)$]. The crosstalk W(t) is caused by cross-polarization modulation (XPolM) and polarization-mode dispersion (PMD). The covariance of the crosstalk W(t) has a short coherence time in particular due to XPolM, which is caused by WDM interfering channels and POLMUX signals.

This invention provides a digital signal processing method 300 to cancel such a fast time-varying XPolM crosstalk by joint decoding of DP signals along with a fast tracking process of the crosstalk channel H(t).

Figure 3:
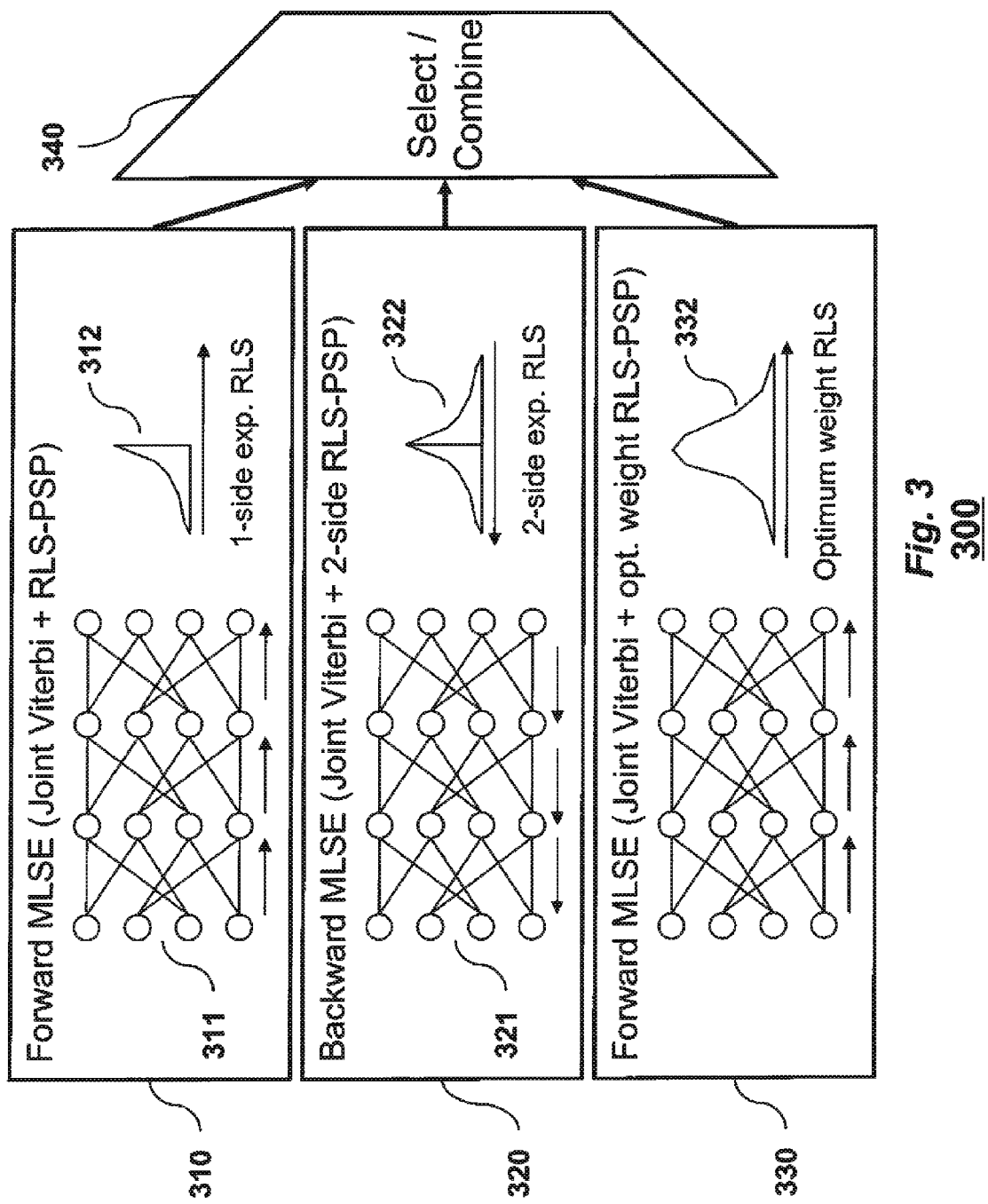
FIG. 3 is a schematic of a 3-stage adaptive XPolM canceller for coherent optical communication systems according to embodiments of the invention.

FIG. 3 shows an XPolM crosstalk canceller according to embodiments of our invention. The method includes 3-stage maximum-likelihood sequence estimation (MLSE), which employs an adaptive filter process of recursive least-squares (RLS) channel tracking as a per-survivor processing (PSP). At the first stage 310, a forward MLSE with a conventional RLS-PSP is performed to obtain an estimated channel matrix and the most-likely transmitted signals.

For the MLSE, a Viterbi process is employed along the joint trellis-state diagram 311, which jointly decodes x-polarization and y-polarization signals by searching for the shortest path metric as follows:

$$\min_{S(t)} \sum_{t \in \mathbb{Z}T_s} \|R(t) - H'(t)S'(t)\|^2,$$

where H'(t) is an estimated channel matrix at time t and S'(t) is a candidate of the transmitted DP signals with Z and $T_s$ being the integer set and the symbol duration, respectively. While our method of the invention jointly decodes DP signals concurrently, some prior art methods separately decode x-polarization and y-polarization signals for the decoding.

The Viterbi process operates on a state machine model that at any time the system being modeled is in some state. There are a finite number of states. While multiple sequences of states, i.e., paths, can lead to a given state, at least one path is a most likely path to that state, called the "survivor path."

Each state has an individual channel estimation H'(t) given from the past survivor paths as a commonly-used RLS process with exponential weighting 312 which significantly decreases the computational complexity by avoiding direct matrix inversions. The least-squares channel estimation is expressed by a cross-correlation matrix $Q_{rs}(t)$ and a auto-correlation matrix $Q_{ss}(t)$ as follows:

$$H'(t) = Q_{rs}(t)Q_{ss}^{-1}(t),$$

$$Q_{rs}(t) = \mathbb{E}[R(t)S^H(t)],$$

$$Q_{ss}(t) = \mathbb{E}[S(t)S^H(t)],$$

where $\mathbb{E}[.]$ and $[.]^H$ denotes an expectation and the Hermitian transpose, respectively. The RLS process uses an exponential weighting to approximate the expectation as $$Q_{ss}(t) \simeq \sum_{\tau \leq t, \tau \in \mathbb{Z}T_s} g^{t-\tau} S'(\tau) S'^H(\tau),$$

where g<1 is called the forgetting factor which controls the exponential weighting window. The RLS process recursively obtains the inverse auto-correlation matrix by a low-complexity rank-one update as follows:

$$Q_{ss}^{-1}(t + T_s) = g^{-1}Q_{ss}^{-1}(t) - g^{-1}\frac{Q_{ss}^{-1}(t)S'(t + T_s)S'^H(t + T_s)Q_{ss}^{-1}(t)}{g + S'^H(t + T_s)Q_{ss}^{-1}(t)S'(t + T_s)}.$$

The channel matrix H(t) is close to orthogonal, which is also useful to improve the ability of channel tracking by introducing unitary-constraint RLS process.

Since the channel rapidly changes, the exponential weighting for RLS channel tracking cannot have a long coherence window, that may not be tolerant against a noise. The invention provides a method to improve performance by increasing the weighting window at the second stage 320 without sacrificing the ability of channel tracking. At the second stage, the MLSE is performed in a reverse direction of time along the backward trellis-state diagram 321. The RLS channel tracking is done with a two-sided exponential weighting 322, which is obtained by both the backward per-survivor processing at the second stage 320 and the forward per-survivor processing at the first stage 310. The correlation matrix is rewritten as $$Q_{ss}(t) \simeq \sum_{\tau \in \mathbb{Z}T_s} g^{-|t-\tau|} S'(\tau)S'^H(\tau),$$

where it includes past data and future data. At the second stage, although the correlation matrix requires a direct inverse, the computational complexity is comparable to the conventional RLS because the matrix size is just 2×2.

To further enhance performance, an optimum-weighted RLS is used at the last stage 330. The optimum weighting function 332 is obtained from the sample covariance of the estimated channel matrix at the second stage:

$$Q_{hh}(t) = \mathbb{E}_{\tau \in \mathbb{Z}T_s}[H'(t+\tau)H'^H(\tau)].$$

To decrease the computational complexity, frequency-domain filtering is done. At last, the decoded sequences at the 3-stage MLSE-RLS are combined or selected by a metric combiner 340.

Figure 4:
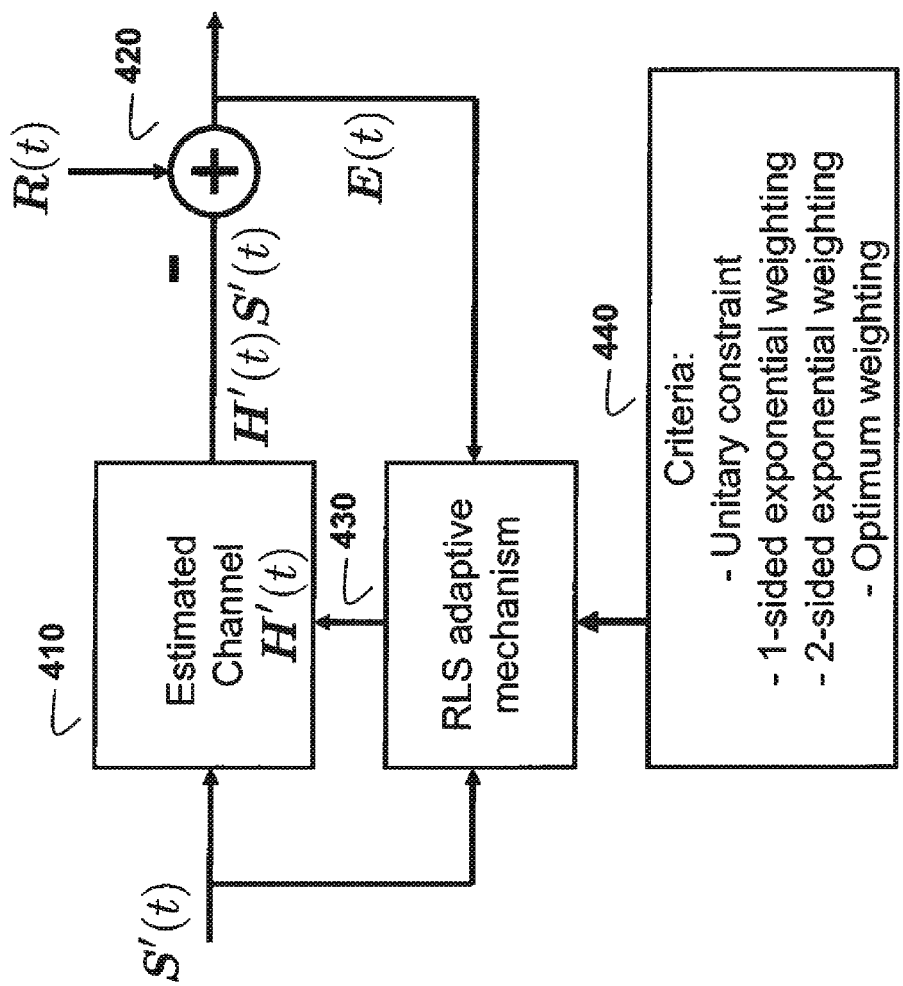
FIG. 4 is a schematic of a block diagram of RLS channel tracking mechanism, according to embodiments of the invention.

FIG. 4 shows a common schematic of adaptive RLS channel tracking mechanism used at each stage. First, the hard-decision data S"(t) is multiplied by an estimated channel matrix H'(t) 410. The replica H'(t)S'(t) is subtracted from the received signal R(t) to obtain an error vector E(t)=R(t)−H'(t)S'(t) 420. To minimize mean square-error (MSE) based on E(t), the channel matrix H'(t) is adaptively updated 430. The adaptive criterion 440 is either 1-side exponential weighted MSE, 2-side exponential weighted MSE, or optimum-weighted MSE with or without unitary constraint, which minimizes non-orthogonality as well as MSE.

For the case of DP-QPSK signals, the total number of states in joint trellis-state diagram of the joint MLSE is a power of 16. Since DP-QPSK has no memory, the trellis-state comes from the channel state transition H(t). For that case, the effective number of trellis-states is generally small, that results in the ML decoding rather than MLSE decoding. To make MLSE more effective, the method of the invention may use different trellis-coded modulations (TCM) for x-polarization and y-polarization signals, with no major modifications. Beside TCM, inner forward-error correction (FEC) channel coding give an additional performance gain with iterative decoding and channel estimating in a turbo principle.

EFFECT OF THE INVENTION

The MLSE-RLS canceller according to embodiments of the invention has more than 3 dB improvement compared to the prior art direct canceller, at a high SNR. In addition to the XPolM cancellation, the method of the invention can cancel other nonlinear impairments of SPM and XPM as well as linear impairment of PMD, whereas the prior art scheme cannot do so.

The method of the invention increases the reach of the fiber distance by improving quality. Hence, the invention makes a great impact for the future long-haul optical communications which achieves beyond 100 Gbps data rate with DWDM and POLMUX. In telecommunication, the term "long-haul" pertains to switched circuits that span large distances, such as inter state, and international communications.

The method offers highly accurate channel tracking with multi-stage weighting refinement for rapid changing crosstalk channels.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for canceling cross-polarization modulation (XPolM) adaptively in a coherent optical communication system, comprising the steps of:
   forward maximum-likelihood sequence estimation (MLSE) decoding, which comprises the steps of
      decoding jointly x-polarization and y-polarization signals concurrently along a joint trellis-state diagram using a Viterbi process;
      estimating crosstalk channels along survivor paths of the Viterbi process using 1-side exponential weighted recursive least-squares (RLS) process; and
      memorizing estimated channels, cross-correlation, auto-correlation, and decoded data for every state along the survivor paths; and
   backward MLSE decoding, which comprises the steps of
      decoding x-polarization and y-polarization signals jointly along the reverse time direction of the joint trellis-state diagram using the Viterbi process;
      estimating crosstalk channels along a reverse time direction of the survivor paths in the joint trellis-state diagram using 2-side exponential weighted RLS, which uses newly computed cross-correlation matrix and the memorized cross-correlation matrix at the forward MLSE decoding; and
      calculating channel covariance matrix based on the estimated crosstalk channel matrices for the ML path;
   MLSE-RLS decoding, which comprises the steps of:
      decoding the x-polarization and y-polarization signals jointly along a joint trellis-state diagram using the Viterbi process;
      estimating a time-varying crosstalk channels for the survivor path, or using an optimum-weighted RLS process, which uses a previously computed channel covariance matrix to improve tracking capability, wherein the steps are performed in a cross-talk canceller.

2. The method of claim 1, further comprising
   filtering a transmitted data candidate S'(t) with an estimated channel matrix H'(t);
   subtracting a replica H'(t)S'(t) from the received signal R(t) to obtain an error vector E(t); and
   updating the estimated channel matrix H'(t) by using an adaptive process to minimize a mean-square error (MSE) with a criterion which is either 1-side exponential weighting RLS, 2-side exponential weighting RLS, or optimum-weighted RLS with or without a unitary constraint.

3. The method of claim 1, wherein any polarization crosstalk caused by the XPolM, and a polarization mode dispersion (PMD) is canceled by the joint MLSE decoding with per-survivor processing (PSP)-RLS channel tracking.

4. The method of claim 1, wherein the x-polarization signal and y-polarization signal are initially orthogonal at an optical POLMUX transmitter, which generates dual-polarized quadrature phase-shift keying (DP-QPSK), or trellis-coded modulations (TCM) for further performance improvement.

5. The method of claim 1, wherein turbo principle of the iterative decoding and iterative channel estimation improves performance for inner FEC channel coding.

6. The method of claim 1, wherein a number of POLMUX signals over different wavelength lights are multiplexed by wavelength-division multiplexing (WDM).

7. The method of claim 1, wherein the optical fiber includes multiple spans of single-mode fibers (SMF), optical amplifiers (OA), and dispersion compensation fibers (DCF) for long-haul communications.

8. The method of claim 2, wherein higher-order RLS channel tracking is applicable to improve tracking capability.

* * * * *